(12) United States Patent
Pandrangi et al.

(10) Patent No.: US 8,971,539 B2
(45) Date of Patent: Mar. 3, 2015

(54) MANAGEMENT OF SSL CERTIFICATE ESCROW

(75) Inventors: Ramakant Pandrangi, Vienna, VA (US); Frank Scalzo, Herndon, VA (US)

(73) Assignee: Verisign, Inc., Reston, VA (US)

( * ) Notice: Subject to any disclaimer, the term of this patent is extended or adjusted under 35 U.S.C. 154(b) by 264 days.

(21) Appl. No.: 12/982,615

(22) Filed: Dec. 30, 2010

(65) Prior Publication Data

US 2012/0170753 A1 Jul. 5, 2012

(51) Int. Cl.
*H04L 9/08* (2006.01)
*G06F 21/62* (2013.01)

(52) U.S. Cl.
CPC .......... *G06F 21/6209* (2013.01); *H04L 9/0894* (2013.01); *G06F 2221/2131* (2013.01)
USPC ............................................ 380/286; 726/22

(58) Field of Classification Search
CPC . H04L 9/0894; H04L 2209/76; H04L 9/0886; H04L 9/08; G06F 21/6209
USPC ...................... 380/286; 713/170, 171; 726/22
See application file for complete search history.

(56) References Cited

U.S. PATENT DOCUMENTS

| | | | | |
|---|---|---|---|---|
| 6,424,718 | B1 * | 7/2002 | Holloway | 380/277 |
| 6,834,112 | B1 * | 12/2004 | Brickell | 380/279 |
| 6,845,160 | B1 * | 1/2005 | Aoki | 380/286 |
| 7,139,917 | B2 | 11/2006 | Jablon | |
| 7,210,037 | B2 * | 4/2007 | Samar | 713/176 |
| 7,424,741 | B1 * | 9/2008 | Grimm et al. | 726/22 |
| 7,640,594 | B2 | 12/2009 | Becker et al. | |
| 8,041,816 | B2 * | 10/2011 | Ozaki et al. | 709/225 |
| 8,423,645 | B2 * | 4/2013 | Jeffries et al. | 709/226 |
| 2002/0042875 | A1 * | 4/2002 | Shukla | 713/151 |
| 2004/0042620 | A1 * | 3/2004 | Andrews et al. | 380/286 |
| 2004/0133774 | A1 * | 7/2004 | Callas et al. | 713/153 |
| 2006/0107318 | A1 * | 5/2006 | Jeffries et al. | 726/22 |
| 2006/0136901 | A1 * | 6/2006 | Nichols | 717/169 |
| 2006/0161667 | A1 * | 7/2006 | Umesawa et al. | 709/229 |

(Continued)

FOREIGN PATENT DOCUMENTS

EP 1 641 176 3/2006

OTHER PUBLICATIONS

SKS OpenPGP Keyserver, Apr. 20, 2009, pp. 1-5.*

(Continued)

*Primary Examiner* — Vivek Srivastava
*Assistant Examiner* — Muhammad A Raza
(74) *Attorney, Agent, or Firm* — MH2 Technology Law Group, LLP

(57) ABSTRACT

Methods and systems for providing a secure SSL certificate escrow service comprise: providing a secure upload webpage for a private key holder to upload an encrypted copy of a private key; receiving the encrypted copy of the private key from the private key holder via the secure upload webpage; storing the encrypted copy of the private key in memory; providing a secure decryption webpage for the private key holder to enable the private key escrow service to decrypt the private key; receiving an instruction to decrypt the private key from the private key holder through the secure decryption webpage; and decrypting the private key in response to the instruction to decrypt the private key.

29 Claims, 12 Drawing Sheets

(56) References Cited

U.S. PATENT DOCUMENTS

| | | | |
|---|---|---|---|
| 2006/0190720 A1* | 8/2006 | Ozaki et al. | 713/160 |
| 2007/0061574 A1* | 3/2007 | Shelest et al. | 713/170 |
| 2007/0118735 A1 | 5/2007 | Cherrington et al. | |
| 2007/0157298 A1 | 7/2007 | Dingwall et al. | |
| 2008/0298588 A1 | 12/2008 | Shakkarwar | |

OTHER PUBLICATIONS

International Search Report and Written Opinion for Int'l. Appln. No. PCT/US2011/064326, mailed Apr. 12, 2012 (8 pages).

Denning, Dorothy E. And Branstad, Dennis K, "A Taxonomy for Key Escrow Encryption Systems", Communications of the ACM, Mar. 1, 1996, pp. 34-40, vol. 39 (7 pages).

\* cited by examiner

SSL Escrow Service

Upload New Private Key

Please provide a name for your key:

Name: _____ 510

Please upload your encrypted PKCS #12 certificate:

Certificate: _____ 520  [Browse]

IMPORTANT: Please be sure to supply only an ENCRYPTED version of your certificate

[Upload] 530  [Cancel]

FIG. 5

SSL Escrow Service – Deploy Private Key – Mozilla Firefox

Hi Admin  English  | Sign Out

SSL Escrow Service   Home | Manage Private Keys | My Account | More | Help

---

Deploy Private Key

You have indicated that you wish to deploy the following private key:

Shopping Cart

Please enter your passcode for decrypting this key.

Passcode: [_____] ~910

921 ~ ☐  I understand that by providing my passcode, I am enabling this service to decrypt and thus have access to my private key. I acknowledge my understanding and acceptance of the <u>terms and conditions</u> governing this operation.

922 ~ ☐  I certify that I am either the holder of the certificate for this key or have been duly authorized to provide access to the key.

[ Decrypt ]   [ Cancel ]
    930

Done

FIG. 9

MANAGEMENT OF SSL CERTIFICATE ESCROW

TECHNICAL FIELD

The present disclosure relates generally to methods and systems for providing a secure SSL certificate escrow service for, inter alia, mitigating against SSL DDoS attacks.

BACKGROUND

In asymmetric key encryption, a host device, such as a server, may securely communicate with another host device, such as a client, by using a private encryption key-public encryption key pair. The server may provide the client with a copy of its public key with the knowledge that other entities, such as hackers or other malicious actors, may also receive copies of the server's public key by "listening" in on communications between the server and the client. Using the server's public key, the client may encrypt data that it transmits to the server such that the encrypted data may be decrypted only using the server's private key. Provided the server keeps its private key secret, only the server will be able to decrypt the public-key-encrypted data from the client.

Private keys may also be used to demonstrate message integrity and end-point authentication by, for example, encrypting a message or hash string of a message using the key holder's private key, a process known as "digitally signing." Although any party with access to the key holder's public key may be able to decrypt the digital signature to verify the message's integrity, since only the key holder has access to the corresponding private key, it may be demonstrated that only the key holder could have digitally signed the message. This feature of asymmetric key encryption also presupposes that the key holder maintains its private key in secret.

In some circumstances, however, it may be beneficial for a private key holder to entrust a third party entity with a copy of its private key. For example, the key holder may wish to entrust a third party mitigation service provider with a copy of its private key to enable the mitigation service provider to intercept and decrypt secure communications directed to the key holder's servers in the event of a Secure Sockets Layer ("SSL") denial-of-service ("DoS") or other form of cyber attack, a novel technique that is further described in co-pending application Ser. No. 12/982,520, which is also assigned to this assignee.

The owner or holder of the private key has essentially two options for providing the mitigation service provider with a copy of its private key. The key holder may provide the mitigation service provider with a copy of the key in advance of any attack on its servers, for example, upon the commencement of the contract between the key holder and the mitigation service provider to provide SSL DoS mitigation services to the key holder. While this approach allows the mitigation service provider to quickly utilize the key holder's private key to mitigate against the SSL DoS attack, it also introduces various security and audit problems.

In particular, the mitigation service provider's possession of the holder's private key may allow the mitigation service provider to impersonate the key holder and thus to potentially gain access to encrypted communications—for example, containing customers' credit card information—intended for the key holder's servers. Or, even if the mitigation service provider does not engage in fraudulent behavior using the holder's private key, an employee of the mitigation service provider or an external hacker could potentially gain access to the private key and thus impersonate the key holder. Because of these and other risks that flow from potentially misappropriated private keys, many organizations have strict policies regarding access to and copies of their private keys. And, consequently, many organizations keep, or may be required contractually or by law to keep, detailed records regarding any internal or third-party possession of or access to copies of their private keys.

The advanced placement of a key holder's private key with a mitigation service provider may conflict with security policies that may prohibit providing a third party with a copy of the holder's key in the absence of an attack or other need by the third party to access the key. Moreover, because the mitigation service provider's internal procedures for storing, copying, and protecting the private key may not be known, it may be difficult for the key holder to maintain a complete and accurate audit trail of all actions that may be taken by the mitigation service provider with respect to the key.

For these and other reasons, the key holder may elect instead to provide the mitigation service provider with a copy of its private key only in the event of an actual cyber attack. While this approach may avoid some of the above-described security and audit problems, it too suffers from a number of disadvantages. Most importantly, in the event of an actual cyber attack, it may be difficult or impossible to quickly provide the mitigation service provider with a copy of the private key. For example, technical difficulties introduced by the cyber attack may collaterally affect other devices or systems from which the key holder would need to access and export its private key.

Also, the same strict policies regarding granting third-party access to the holder's private key and maintaining appropriate audit trails for the key may prevent the key holder from being able to access or distribute the key until various procedural steps, including potentially obtaining authorization from multiple, separate corporate custodians, have been followed. This too may prevent the key holder from quickly providing a copy of its private key to the mitigation service provider to enable the mitigation service provider to expeditiously intervene and blunt the attack. Moreover, in either case, there may not exist an efficient and secure manner for distributing the key to the mitigation service provider, since conventional means for distributing private keys, such as by e-mail or by sending a storage device by mail, may present additional security and audit problems.

There is therefore a need for methods and systems for enabling a private key holder to quickly and securely provide a third party with access to the holder's private key in the event of a cyber attack, or other need for the third party to access the key, while simultaneously limiting and regulating the third party's access to the private key in other circumstances.

SUMMARY OF THE INVENTION

The present invention comprises methods and systems for enabling a key holder to securely upload an encrypted copy of its private key to an SSL certificate escrow service provider and to subsequently provide a passcode to the escrow service provider for decrypting the private key in the event that a third party ever needs access to the unencrypted private key. Embodiments of the present invention may operate in the area of a DDoS mitigation service in which a mitigation service provider requires access to the private key in order to mitigate against an SSL DDoS attack on behalf of the key holder. Other embodiments may also apply to other situations in which a key holder wishes to be able to quickly and securely provide a third party with access to its private key.

Additional objects and advantages of the invention will be set forth in part in the description that follows, and in part will be obvious from the description, or may be learned by practice of the invention. The objects and advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate various embodiments of the invention and together with the description, serve to explain the principles of the invention. In the drawings:

FIG. 5 is a diagram illustrating an exemplary certificate upload page of a secure SSL certificate escrow web platform, consistent with certain disclosed embodiments;

FIG. 9 is a diagram illustrating an exemplary deployment page of a secure SSL certificate escrow web platform, consistent with certain disclosed embodiments;

DETAILED DESCRIPTION OF THE INVENTION

Figure 1:
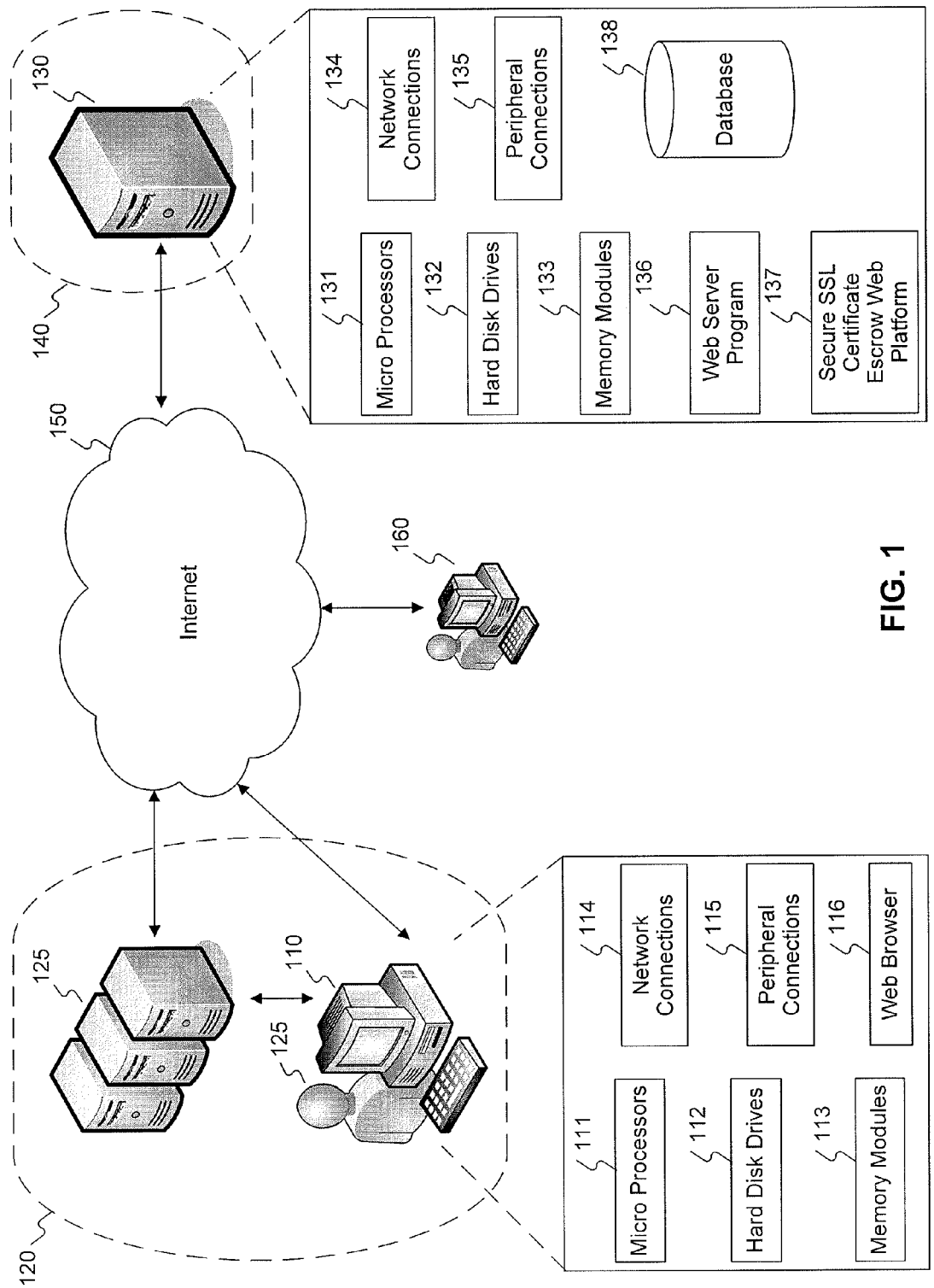
FIG. 1 is a diagram illustrating exemplary network communications between a private key holder and an SSL escrow service provider, consistent with certain disclosed embodiments.

The following detailed description refers to the accompanying drawings. Wherever possible, the same reference numbers are used in the drawings and the following description to refer to the same or similar parts. While several exemplary embodiments and features of the invention are described herein, modifications, adaptations, and other implementations are possible, without departing from the spirit and scope of the invention. Accordingly, the following detailed description does not limit the invention. Instead, the proper scope of the invention is defined by the appended claims.

In a DoS or distributed denial-of-service ("DDoS") attack, one or more client machines may attempt to overwhelm a server by sending a large number of requests to the server in rapid succession. Because web servers are configured by default to accept requests from all clients, and because the Hypertext Transfer Protocol ("HTTP") provides little information about the requesting clients that would enable the server to determine the nature of each client's intentions in making requests, the attacked web server may be slow or unable to respond to other, legitimate requests due to the burdens imposed on the server when servicing the flood of requests from the malicious clients.

One technique for discriminating between legitimate requests and malicious requests is to use a client "challenge" mechanism in which requesting clients are challenged to perform an operation specified by the server before the server will commit further resources to servicing the clients' requests. This technique is premised on the fact that most clients participating in a DoS or DDoS attack make their requests to the attacked server pursuant to a computer program or script that instructs clients to do little more than make requests to the attacked server in a rapid fashion. Since the goal of a DDoS attack may be to burden the attacked server as much as possible while minimizing the burden on the attacking clients, DDoS clients may be programmed to ignore any responsive communications from the attacked server or to take any further actions apart from making the nuisance requests or connections. Therefore, by challenging clients to perform one or more tasks before committing significant server resources to their requests, servers may be able to separate legitimate clients from mere "dumb" attack scripts.

Still, conventional client challenge mechanisms may be ineffective at protecting against DoS or DDoS attacks in cases where simply performing client challenge mechanisms may sufficiently overwhelm a server that it is not able to service clients that successfully complete the challenges. For example, in an SSL DDoS attack, prior to making any application layer requests or communications to servers, malicious clients may first request a secure channel of communications with the server using the SSL protocol. In order to even challenge the client, the server must first successfully establish a new SSL session with the malicious client, which may require the server to perform expensive exponentiation and memory allocation resources. Even if the malicious client fails to successfully complete a challenge mechanism posed by the server after establishing the SSL session, the mere process of having to establish the initial SSL session by the attacked server may so overwhelm the server that the SSL DDoS attack may be successful.

One novel technique for mitigating against DoS and DDoS attacks, and SSL DDoS attacks in particular, is to redirect all client traffic to a third-party mitigation server that is capable of bearing the computational burdens of challenging each and every requesting client, and forwarding only traffic from clients that successfully complete one or more challenge mechanisms. This novel technique is further described in co-pending application Ser. No. 12/982,520, which is also assigned to this assignee and is hereby incorporated by reference. However, in order to challenge SSL clients on behalf of the attacked server, the third-party mitigation server must be able to first establish SSL sessions with such clients on behalf of the attacked server. This operation may not only require the mitigation server to present the attacked server's public key certificate to any SSL clients, but also to decrypt communications from those SSL clients using the attacked server's corresponding private key.

FIG. 1 is a diagram illustrating exemplary network communications between a private key holder and an SSL certificate escrow service provider. In FIG. 1, a company or organization 120 may operate one or more servers 125 that communicate with one or Internet users or clients 160 through the Internet 150. Organization 120 may hold one or more public-private asymmetric key pairs (not depicted) for enabling its servers 125 to securely communicate with clients 160 using secure communication protocols such as SSL and Secure Hypertext Transfer Protocol ("HTTPS"). Organization 120 may wish to entrust an SSL certificate escrow service provider ("escrow service provider") 140 with copies of one or more of its private keys. Organization 120 may wish to entrust escrow service provider 140 with copies of its private keys to enable escrow service provider 140 to securely communicate with clients 160 on organization 120's behalf, for example to mitigate against an SSL DoS attack or other form of cyber attack.

Organization 120 may also own one or more client devices 110, such as a personal computer employee workstations, that are able to securely connect to organization 120's servers to access one or more of organization 120's private keys. Client device 110 may comprise, for example, one or more micro processors 110 of varying core configurations and clock frequencies; one or more hard disk drives 112 of varying physical dimensions and storage capacities; one or more random access memory (RAM) modules 113 of varying clock frequencies and memory bandwidth; one or more input/output network connections 114 or peripheral connections 115. Client device 110 may also include one or more software applications for communicating with networked devices, such as a web browser 116. Web browser 116 may include, for example, Mozilla Firefox®, Internet Explorer®, Google Chrome®, Apple Safari®, or Opera®.

To provide escrow service provider 140 with copies of one or more of organization 120's private keys, a user 125, such as an employee of organization 120, may use client device 110 to establish a secure network connection to a server 130 that is owned or operated by escrow service provider 140. Client device 110 may connect to server 130 through Internet 120 using, for example web browser application 116 and various communications protocols, such as Ethernet, Internet Protocol (IP), Transmission Control Protocol (TCP), User Datagram Protocol (UDP), HTTP, or a combination of these and other communications protocols.

Server 130 may be a dedicated web server, a web server system, or another device capable of receiving and responding to requests from clients, such as HTTP requests and HTTPS requests. Server 130 may comprise, for example, one or more micro processors 131 of varying core configurations and clock frequencies; one or more hard disk drives 132 of varying physical dimensions and storage capacities; one or more random access memory (RAM) modules 133 of varying clock frequencies and memory bandwidth; one or more input/output network connections 134 or peripheral connections 135. Server 130 may also include, for example, in volatile and/or persistent memory, a web server program 136, for providing basic functionality for responding to HTTP and HTTPS requests, and software for implementing a secure SSL certificate escrow web platform ("escrow web platform") 137, for providing custom, dynamic webpages to clients through web server program 136. Web server program 136 and escrow web platform 137 may interface with one or more databases 138, such as Oracle®, SQL Server®, MySQL®, or Sybase®.

Figure 2:
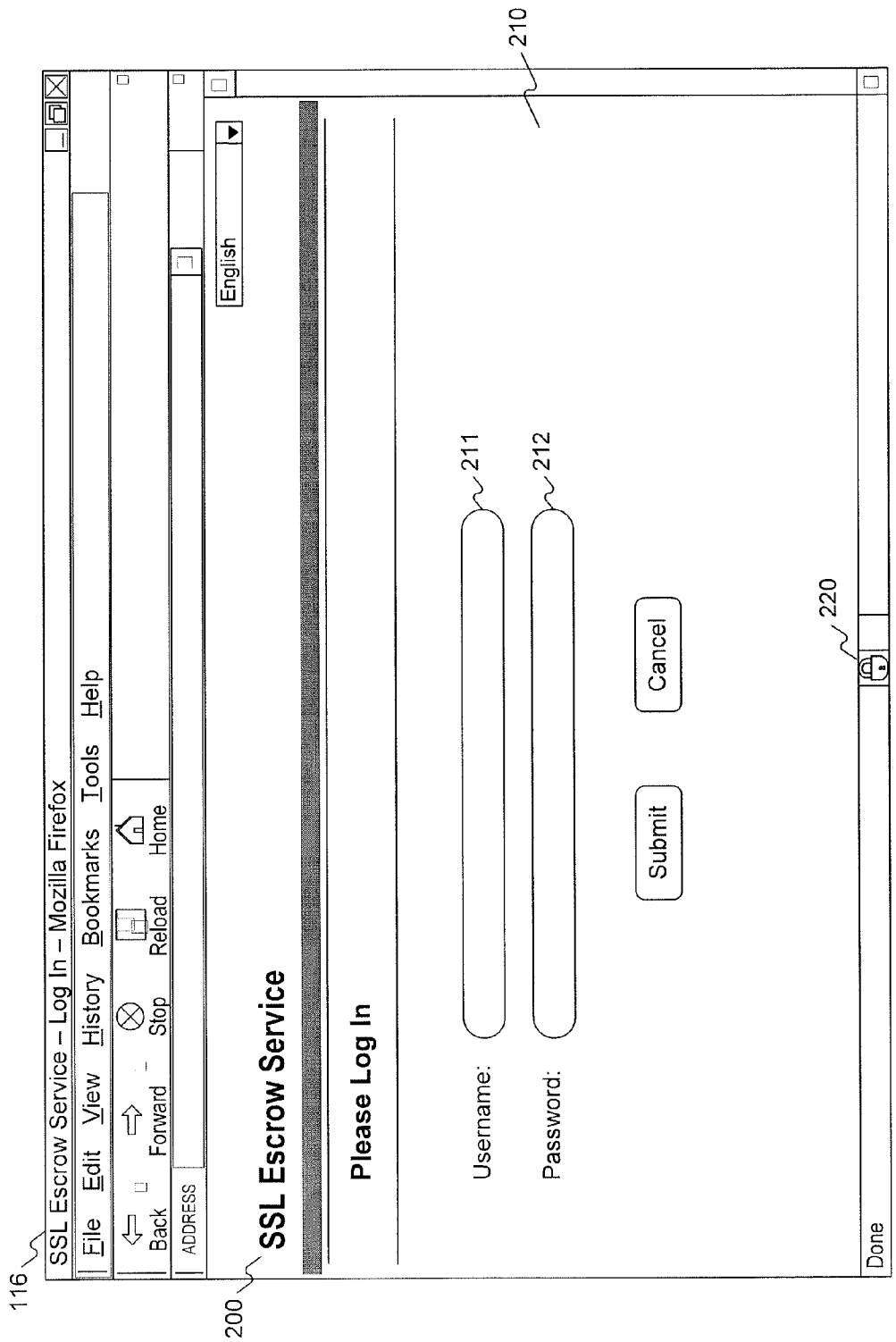
FIG. 2 is a diagram illustrating an exemplary account login page of a secure SSL certificate escrow web platform, consistent with certain disclosed embodiments.

FIG. 2 is a diagram illustrating an exemplary account login page of a secure SSL certificate escrow web platform, consistent with certain disclosed embodiments. User 125 may connect to server 130 using client device 110 and web browser software application 116, which may make an HTTP or HTTPS request for a web page 210 in the form of an HTML file. As shown in FIG. 2, account login page 210 may be one webpage within a secure SSL certificate escrow web platform ("escrow web platform") 200, which may be offered by escrow service provider 140 as part of an SSL certificate escrow service. Account login page 210 may comprise a web form for allowing user 125 to log into escrow web platform 200, and may include a textbox 211 for providing a username and a textbox 212 for providing a password. In one embodiment, one or more webpages in escrow web platform 200 are delivered to client device 110 over a secure connection, such as an SSL connection to enable secure HTTP ("HTTPS") connectivity, as depicted by the lock icon 220 displayed in browser software application 116.

Escrow web platform 200 may include functionality for enabling organization 120 to create one or more user accounts for uploading and managing private keys held by organization 120. In one embodiment, in order to prevent hacking of organization 120's accounts or unauthorized access, account login page 210 may reject any login attempts that are made by client devices using IP addresses that do not match one or more IP addresses or ranges of IP addresses associated with organization 120.

Figure 3:
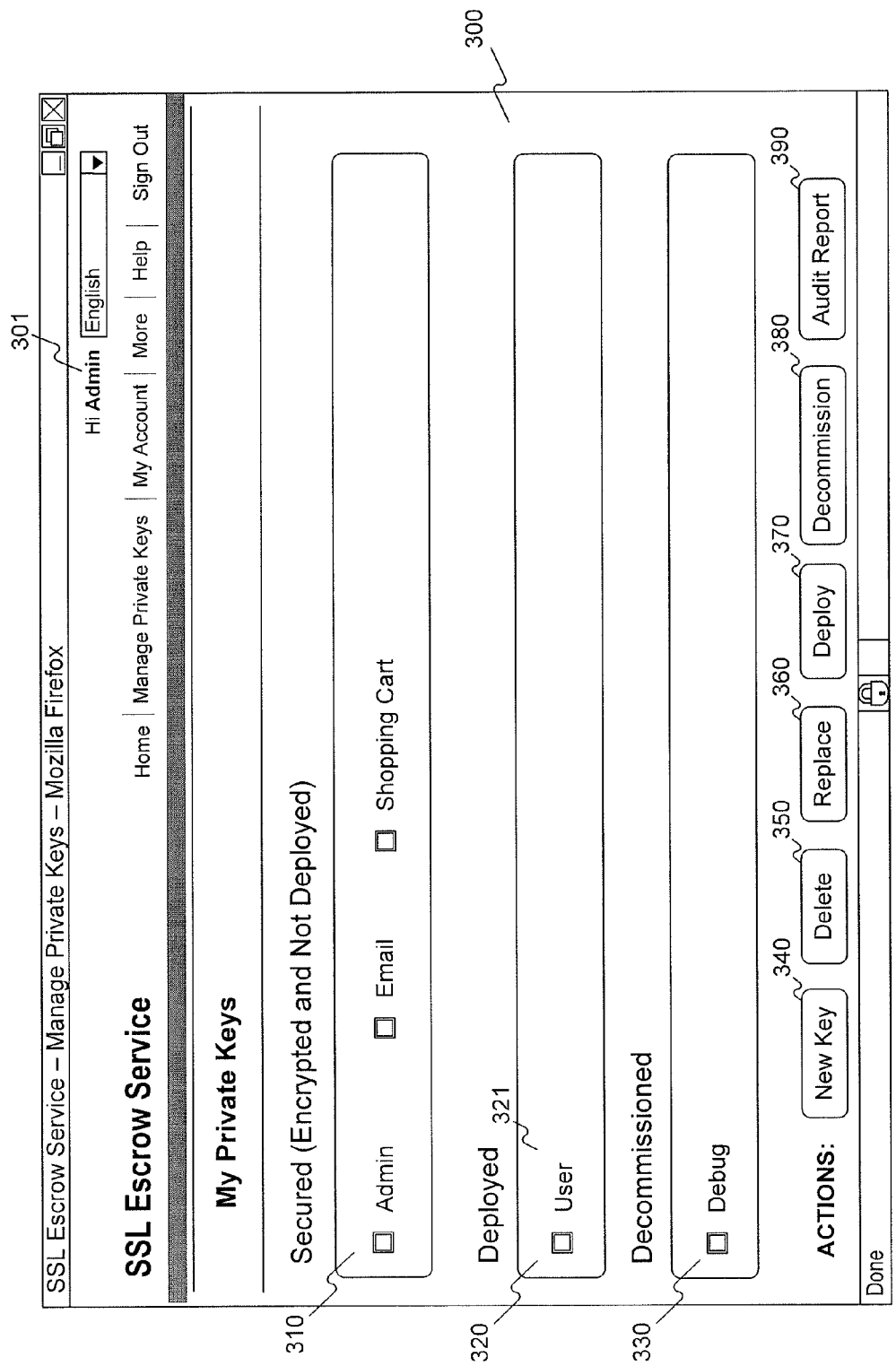
FIG. 3 is a diagram illustrating an exemplary account management page of a secure SSL certificate escrow web platform, consistent with certain disclosed embodiments.

FIG. 3 is a diagram illustrating an exemplary account management page of a secure SSL certificate escrow web platform, consistent with certain disclosed embodiments. If user 125 successfully logs into escrow web platform 200, the browser application 116 on client device 110 may be directed to an account management page 300 that may be customized for a particular user account 301. Account management page 300 may enable user 301 to manage various keys associated with organization 120, such as organization 120's private asymmetric keys. For example, organization 120 may have provided one or more of its private keys to escrow service provider 140 to allow escrow service provider 140 to act on organization 120's behalf in the context of SSL communications, such as in the event of a SSL DDoS attack. Using account management page 300, user 301 may manage escrow service provider 140's use of these private keys.

Account management page 300 may include a section 310 listing each of organization 120's private keys that have been uploaded to the escrow web platform 200 but not yet decrypted. Account management screen 300 may include a section 320 listing each of organization 120's private keys that have been decrypted and deployed by escrow service provider 140 on behalf of organization 120. Account management screen 300 may also include a section 330 listing each of organization 120's private keys that have been uploaded to escrow web platform 200, that have been decrypted and deployed by escrow service provider 140, and which organization 120 has subsequently instructed escrow service provider 140 to cease using.

Each section 310, 320, 330 may include information for identifying private keys, such as a user-supplied name 321 for the private key or other relevant information (not depicted). Account management page 300 may also include web controls, such as buttons 340-390, for instructing escrow service provider 140 to perform various operations with respect to one or more private keys.

In one embodiment, as depicted in FIG. 3, escrow web platform 200 may not provide functionality for allowing users to download copies of any previously uploaded keys. The absence of download functionality may help organization 120 to maintain security for its private keys by preventing an employee of organization 120, or other person able to obtain user 301's login credentials, from obtaining access to organization 120's private keys using escrow web platform 200.

Figure 4:
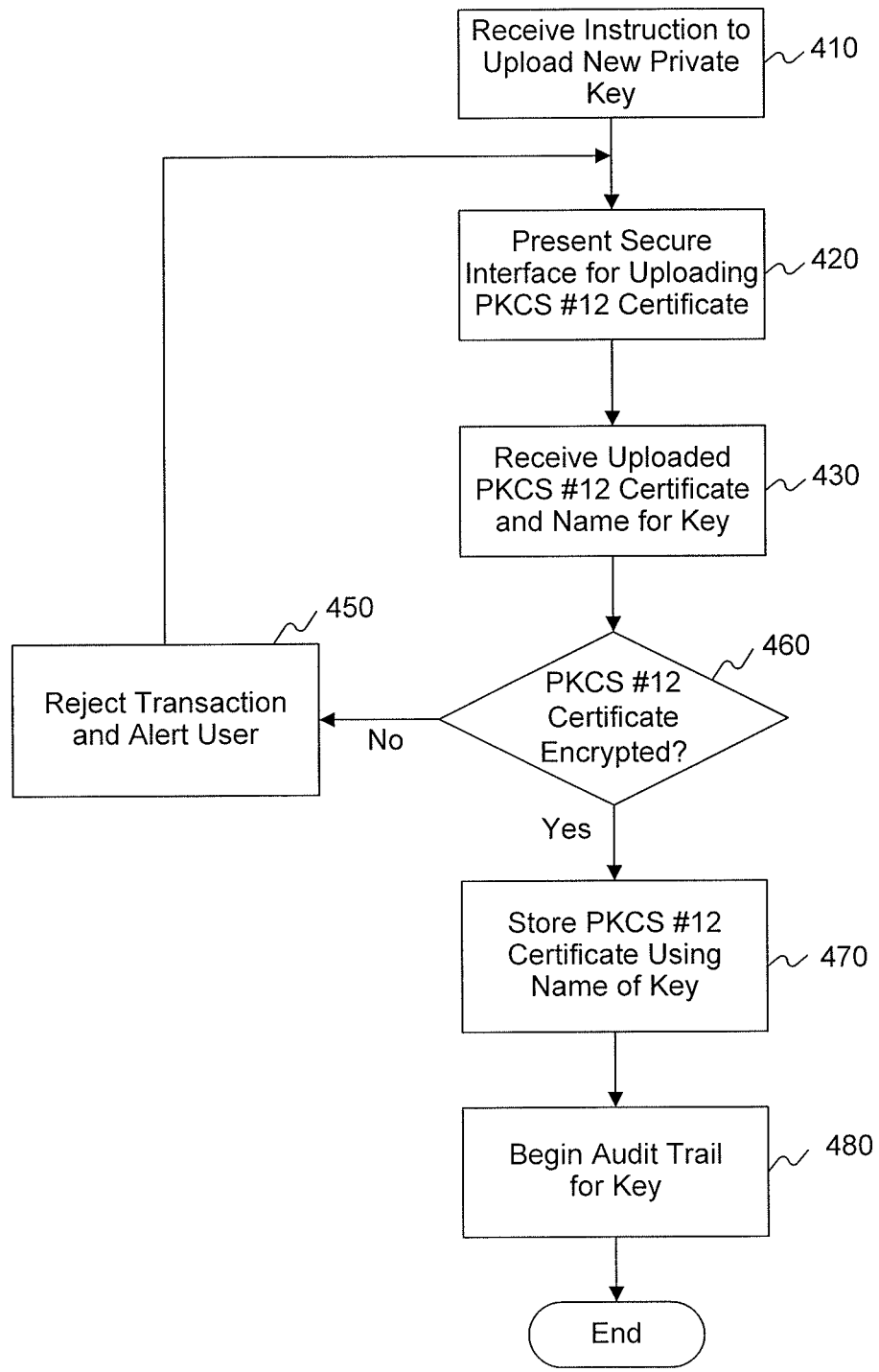
FIG. 4 is a flow diagram depicting an exemplary method for uploading a new private key to a secure SSL certificate escrow web platform, consistent with certain disclosed embodiments.

FIG. 4 is a flow diagram depicting an exemplary method for uploading a new private key to a secure SSL certificate escrow web platform, consistent with certain disclosed embodiments. In one embodiment, user 301 may upload a private key in the form of an encrypted Public-Key Cryptography Standards #12 ("PKCS #12") certificate. A PKCS #12 certificate is single file that is capable of storing a private key, such as an X.509 asymmetric private key, along with a corresponding public key certificate, which itself includes the corresponding public key. A PKCS #12 certificate may also be encrypted using a symmetric passcode or passphrase to prevent the private key from being extracted from the PKCS #12 certificate without supplying the passphrase. User 125, or another user associated with organization 120, may export organization 120's private key and corresponding public key certificate and may supply a passphrase at the time of exportation to generate an encrypted PKCS #12 certificate containing organization 120's private key and corresponding public key certificate. Alternatively, user 125 may encapsulate organization 120's private key using a different file format, such as a Parallel Framework Extensions ("PFX") file. User 125 or user 301 may upload any one of the private key, public key, and public certificate individually. Because private keys are often stored in PKCS #12 certificates and other files together with their corresponding public key certificates, the terms "private key," "PKCS #12 certificate," and "certificate" (as opposed to "public key certificate") are used interchangeably throughout this application.

User 301 may upload the encrypted PKCS #12 certificate to escrow web platform 200, where escrow service provider 140 may maintain a copy of the encrypted PKCS #12 certificate. In the event of an SSL DDoS attack, or any other event in which organization 120 needs to provide a third party, such as escrow service provider 140, with access to its private key, user 301 may log into escrow web platform 200, where user 301 may supply escrow service provider 140 with the passphrase to decrypt the PKCS #12 certificate and thereby use organization 120's private key to mitigate against the SSL DDoS attack. Moreover, once the SSL DDoS attack has subsided, user 301 may log into escrow web platform 200 to instruct escrow service provider 140 no longer use and/or delete organization 120's private key.

In step 410, escrow web platform 200 receives an instruction from a user to upload new private key, for example as a result of user 301 clicking the new key button 340 on account management page 300. In response, escrow web platform 200 provides user 301 with a secure interface for uploading a PKCS #12 certificate or other file containing organization 120's private key (step 420).

FIG. 5 is a diagram illustrating an exemplary certificate upload page of a secure SSL certificate escrow web platform, consistent with certain disclosed embodiments. As depicted in FIG. 5, certificate upload page 500 includes a textbox 510 for allowing user 301 to provide a name for the private key and a textbox 520 for allowing user 301 to specify a file system path (e.g., on client device 110) for selecting a PKCS #12 certificate file to upload.

In step 430, escrow web platform 200 receives an uploaded PKCS #12 certificate file containing a private key and a user-provided name to be associated with the key by web platform 200, for example as a result of user 301 clicking upload button 530. In one embodiment, to further security, escrow web platform 200 may be configured to first determine whether the uploaded PKCS #12 certificate is encrypted (step 460) and, if the uploaded certificate is not encrypted (step 460, No) reject the certificate and alert the user that the user has attempted to upload an unencrypted certificate (step 450). If escrow web platform 200 determines that the uploaded certificate is encrypted (step 460, Yes), then escrow web platform 200 may store the uploaded certificate into memory (step 470), for example on server 130 or a database or other memory accessible to server 130.

Escrow web platform 200 may ensure that the uploaded certificate is stored in a secure memory location that is accessible only to secure processes executing on server 130, such that no human operator would be able to copy or otherwise access the uploaded certificate. Escrow web platform 200 may also create a new audit trail for the uploaded private key (step 480) to note, for example, the date and time that the certificate was uploaded, the user who uploaded the certificate, whether the certificate was encrypted, and a hash or other signature corresponding to the binary or hexadecimal structure of the uploaded certificate.

In another embodiment, escrow platform 200 may provide functionality to allow users to encrypt private keys using a passphrase at the time of upload. In particular, certificate upload page 500 may provide an additional textbox (not depicted) for allowing the user to enter a passphrase to encrypt the uploaded PKCS #12 certificate. This layer of encryption may be in lieu of or in addition to any encryption that had already been applied to the uploaded PKCS #12 certificate. Escrow web platform 200 may encrypt the uploaded certificate using the passphrase prior to storing the certificate in memory. Alternatively, web platform 200 may store the uploaded certificate in memory in the same form that it was uploaded and may associate the certificate with the user-provided passphrase by storing the passphrase in memory, or by hashing the certificate against the passphrase and storing the resulting hash string in memory to preserve security for the user-provided passphrase.

In this embodiment, in order to deploy an uploaded encrypted private key, the holder of the key must provide escrow web platform 200 with both the passcode used to encrypt the certificate prior to upload and the passphrase used to encrypt the certificate at the time of upload. This double-passcode protection may add an additional layer of security, particularly in the case where one employee of organization 120 is responsible for encrypting the original PKCS #12 certificate and another employee is responsible for providing the passphrase to escrow web platform 200 at the time of upload. In this case, in order to decrypt the key, two separate employees may need to provide two separate passwords to escrow web platform 200, thus helping to guard against malicious or accidental decryption authorizations.

Figure 6:
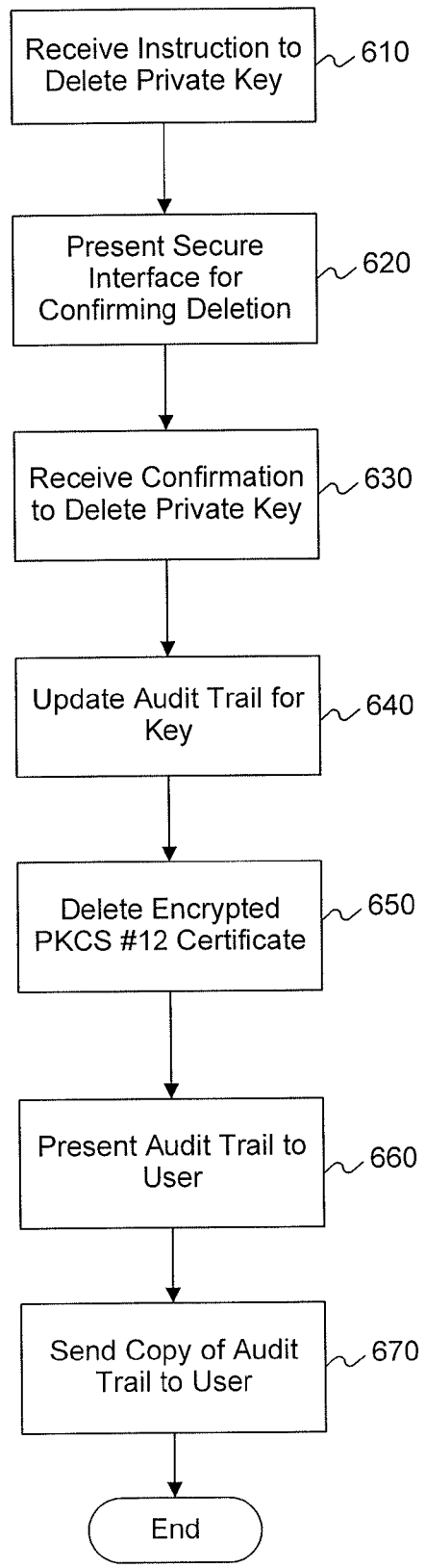
FIG. 6 is a flow diagram depicting an exemplary method for deleting a private key stored within a secure SSL certificate escrow web platform, consistent with certain disclosed embodiments.

FIG. 6 is a flow diagram depicting an exemplary method for deleting a private key stored within a secure SSL certificate escrow web platform, consistent with certain disclosed embodiments. In step 610, escrow web platform 200 receives an instruction from a user to delete a private key, for example as a result of user 301 clicking the delete button 350 on account management page 300. In response, escrow web platform 200 provides the user with a secure interface for confirming that the user wants to delete the selected private key (step 620).

Figure 7:
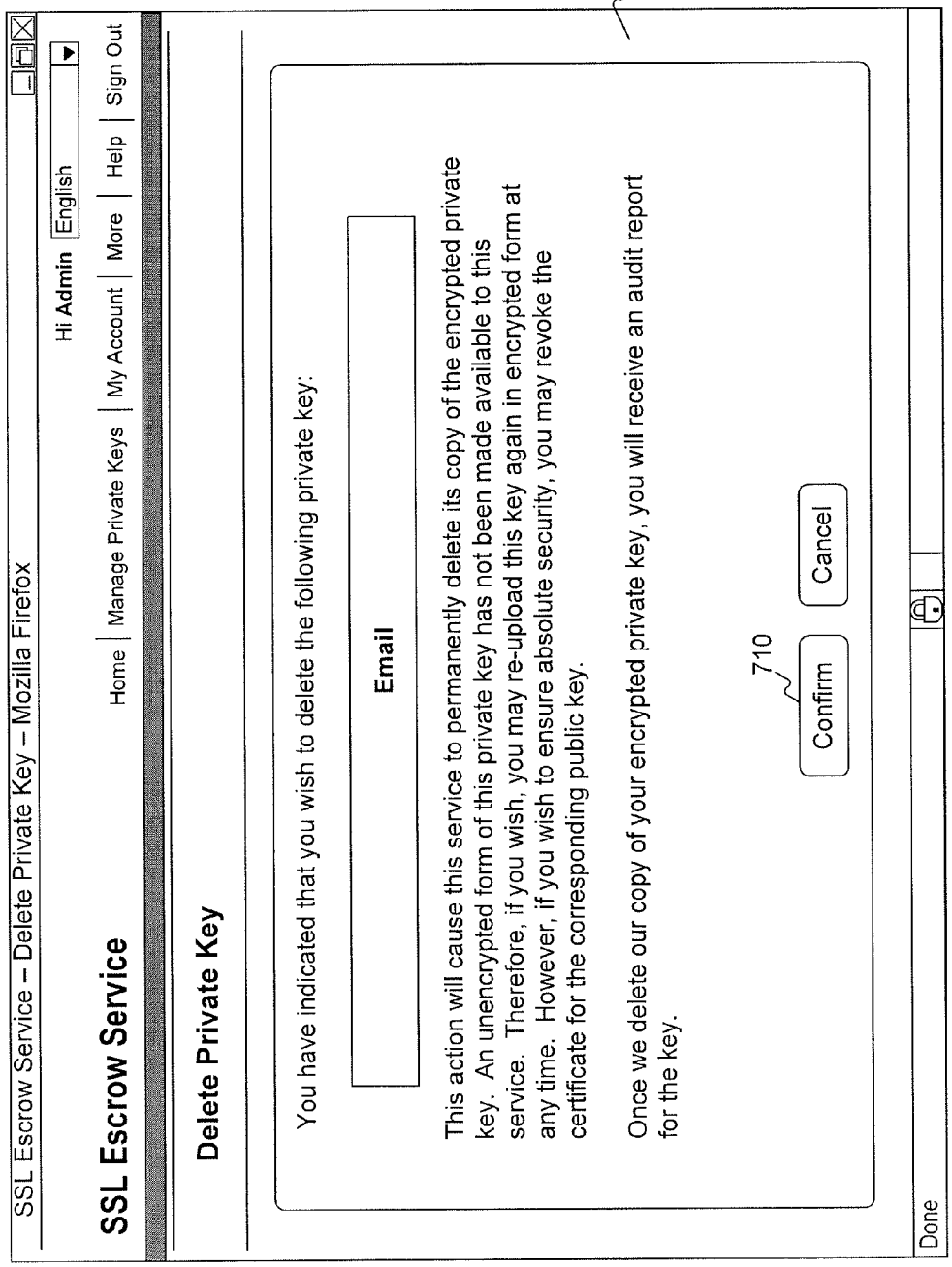
FIG. 7 is a diagram illustrating an exemplary deletion confirmation page of a secure SSL certificate escrow web platform, consistent with certain disclosed embodiments.

FIG. 7 is a diagram illustrating an exemplary deletion confirmation page of a secure SSL certificate escrow web platform, consistent with certain disclosed embodiments. As depicted in FIG. 7, delete confirmation page 700 provides information about the private key selected for deletion and asks the user to confirm or cancel the deletion request. In the embodiment depicted in FIG. 7, the user has selected for deletion a private key that has been neither decrypted nor deployed. Since the selected key has not been decrypted, escrow web platform 200 would not have had access to the unencrypted private key. Therefore, the organization 200 likely would not need to be concerned about the security of its key after escrow web platform 200 deletes the encrypted key. Accordingly, a user may re-upload the same private key at a later time, either in the same encrypted form or a different encrypted form, to allow escrow service provider 140 to maintain a copy of the key for SSL DDoS mitigation services.

In step 630, escrow web platform 200 receives confirmation that the user wishes to delete the selected private key, for example as a result of user 301 clicking the confirm button 710. In response to the confirmed deletion request, escrow web platform 200 updates the audit trail associated with the selected key (step 640). Escrow web platform 200 may update the audit trail to include information about the selected key from the time of its uploading to the time of its deletion, for example, the date and time that the key was deleted, an indication that the key was never decrypted and that escrow service provider 140 was never provided with the passphrase for decrypting the key, a list all employees of escrow service provider 140 that had access to the encrypted key, the number of copies of the key that were made by escrow service provider 140, a confirmation that all copies of the key have been permanently deleted, etc.

In step 650, escrow web platform 200 permanently deletes all copies of the encrypted PKCS #12 certificate. Escrow web platform 200 may also present the audit trail for the deleted key to the user (step 660) by redirecting the user to an audit trail page, such as the webpage depicted in FIG. 12, and may send a copy of the audit trail to the user (step 670). In other embodiments, deletion confirmation page 700 may provide functionality for allowing a user to delete copies of private keys that have already been decrypted or decrypted and deployed.

Although not depicted, in response to a user clicking the replace button 360 on the account management page 300, escrow web platform 200 may perform operations similar to those described with respect to FIGS. 4-7 by deleting a selected key and replacing it with a new, uploaded key.

Figure 8:
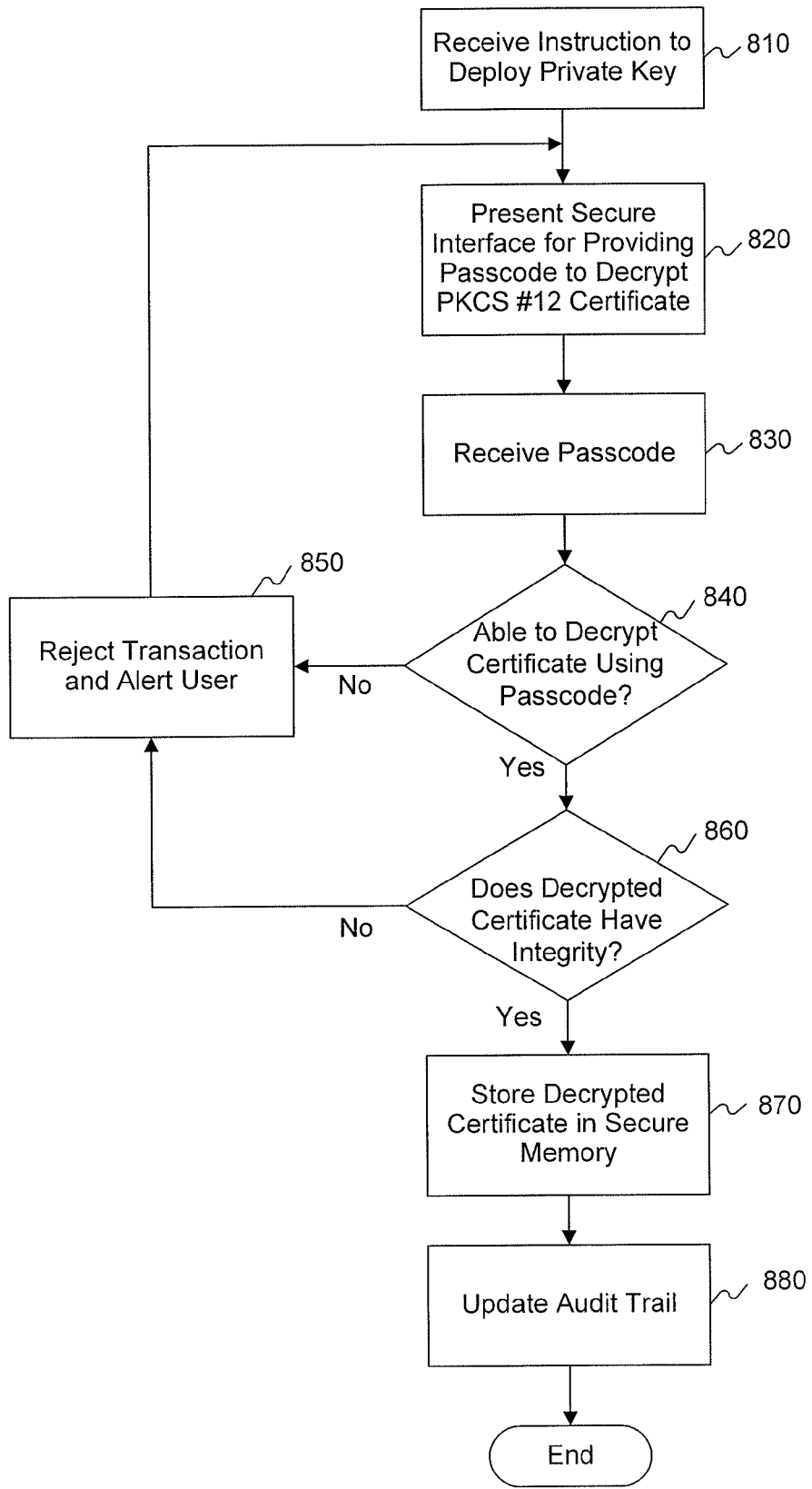
FIG. 8 is a flow diagram depicting an exemplary method for deploying a private key stored within a secure SSL certificate escrow web platform, consistent with certain disclosed embodiments.

FIG. 8 is a flow diagram depicting an exemplary method for deploying a private key stored within a secure SSL certificate escrow web platform, consistent with certain disclosed embodiments. In step 810, escrow web platform 200 receives an instruction from a user to deploy a private key, for example as a result of user 301 clicking the deploy button 370 on account management page 300. In response, escrow web platform 200 may provide the user with a secure interface for allowing the user to supply one or more passcodes to decrypt the selected key (step 820).

FIG. 9 is a diagram illustrating an exemplary deployment page of a secure SSL certificate escrow web platform, consistent with certain disclosed embodiments. As depicted in FIG. 9, deployment page 900 provides information about the private key selected for deployment and provides a textbox 910 for allowing the user to supply the relevant passcode for decrypting the selected private key. Deployment page 900 may also include one or more checkboxes 921, 922 to require the user requesting deployment to acknowledge or certify certain facts.

In step 830, escrow web platform 200 receives a passcode from the user, for example as a result of the entering the passcode into textbox 910 and clicking the decrypt button 930. In step 840, escrow web platform 200 attempts to apply the user-supplied passcode to the encrypted PKCS #12 certificate stored in memory for the selected key. If escrow web platform 200 is not able to decrypt the certificate using the passcode (step 840, No), escrow web platform 200 may alert the user of the failed decryption operation and note that the selected private key has not been decrypted (step 850).

If escrow web platform 200 is able to decrypt the certificate using the passcode (step 840, Yes), escrow web platform 200 may verify the integrity of the decrypted certificate. For example, in step 860, escrow web platform 200 may extract from the decrypted PKCS #12 certificate organization 120's private key and its corresponding public key certificate. Escrow web platform 200 may verify that the extracted private key-public key pair is properly asymmetric—e.g., that data encrypted by the private key may be decrypted only by the public key and vice-versa—and that the public key certificate properly authenticates the public key. If escrow web platform 200 determines that the decrypted certificate lacks integrity or has any other problem (step 860, No), escrow web platform 200 may alert the user of any problems with the decrypted certificate (step 850) and potentially prompt the user to take further action, such as curing any deficiencies with the certificate or uploading a new certificate.

If escrow web platform 200 determines that the decrypted certificate has proper integrity (step 860, Yes), escrow web platform 200 may store the decrypted certificate in secure memory (870). Escrow web platform 200 may store the decrypted certificate in a secure memory location that is accessible only to secure processes executing on server 130 such that no human operator would be able to copy or otherwise access the decrypted certificate. Escrow web platform 200 may also update the audit trail for the decrypted private key to note, for example, the date and time that the key was decrypted, the user who authorized the decryption of the key, and the existence and/or number of failed decryption attempts.

As previously described, in another embodiment, the private key selected for deployment may have been uploaded to escrow web platform 200 using a form of double-encryption in which the key was not only encrypted when the relevant PKCS #12 certificate was exported, but the certificate was further encrypted at the time of upload by supplying a passphrase to escrow web platform 200. In this embodiment, deployment page 900 may provide two separate textboxes for decrypting the certificate: one textbox for providing the passphrase to decrypt the second layer of encryption on the certificate and one textbox for providing the passcode to decrypt first layer of encryption on the certificate. Alternatively, escrow platform 200 may provide two different deployment pages, which must be accessed by two different users, in order for the two different user responsible for each layer of encryption to provide the relevant passcode or passphrase.

In yet another embodiment, a person, such as an employee of organization 120, may place a phone call to escrow service provider 140 to supply one or more passwords orally. Escrow service provider 140 may allow for organization 120 to authorize decryption by phone, for example, in the event that a cyber attack (which may necessitate the deployment of organization 120's private key) prevents employees of organization 120 from accessing escrow web platform 200 through network communications. In one embodiment, an operator associated with escrow service provider 140 may have access to deployment page 900 or a similar operator-version of deployment page 900 for inputting one or more passcodes on organization 120's behalf in order to deploy one or more private keys held by organization 120.

In some embodiments, the act of deploying a private key may comprise decrypting the key in order to grant escrow service provider 140 or another third party access to the unencrypted private key. In other embodiments, once escrow service provider 140 has been granted access to the unencrypted key, escrow service provider 140 may further use the private key to engage in secure communications on organization 120's behalf. For example, escrow service provider 140 may also provide DoS and DDoS mitigation services, including mitigation against SSL DDoS attacks. Using techniques further described in co-pending application Ser. No. 12/982,520, escrow service provider 140 may intercept communications directed to organization 120's servers 125 in order to filter requests from legitimate or normal clients from requests from malicious or suspect clients, such as DoS or DDoS participants.

In the case of an SSL DDoS attack against organization 120's servers 125, escrow service provider 140 may use organization 120's private key to establish SSL sessions or connections with clients that request secure communications in order to subject those clients to one or more challenge mechanisms to assess their legitimacy. However, the invention is not limited to providing an SSL certificate escrow service for the purpose of mitigating against DoS or DDoS attacks. Those skilled in the art will appreciate that the invention has utility for any situation in which an organization wishes to securely provide a third party with a copy of its private key and/or to prevent the third party from accessing the unencrypted private key until the organization gives the third party specific authorization to access the key.

Figure 10:
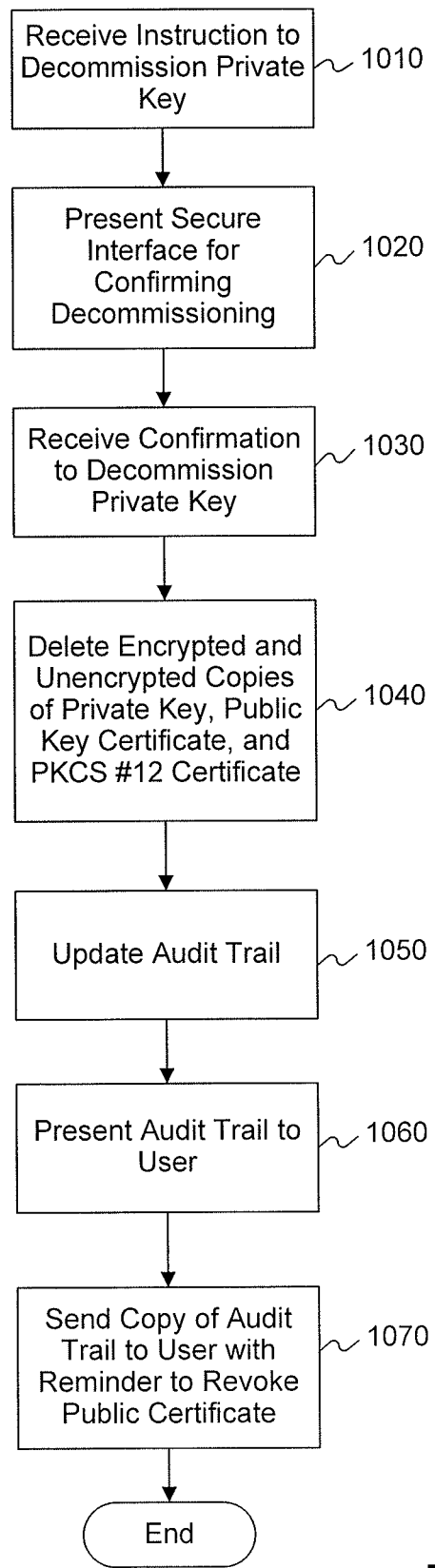
FIG. 10 is a flow diagram depicting an exemplary method for decommissioning a deployed private key using a secure SSL certificate escrow web platform, consistent with certain disclosed embodiments.

FIG. 10 is a flow diagram depicting an exemplary method for decommissioning a deployed private key using a secure SSL certificate escrow web platform, consistent with certain disclosed embodiments. In step 1010, escrow web platform 200 receives an instruction from a user to decommission a deployed private key, for example as a result of user 301 clicking the decommission button 380 on account management page 300. In response, escrow web platform 200 may provide the user with a secure interface asking the user to confirm the requested decommissioning (step 1020). In some embodiments, the act of decommissioning a deployed private key may comprise instructing the escrow service provider 140 to no longer use the decrypted private key, for example to no longer communicate with SSL clients 160 using organization 120's private key.

In other embodiments, the act of decommissioning may require the escrow service provider 140 to also delete all copies of the decrypted private key, as well as any encrypted copies of the key or its PKCS #12 certificate. For example, a user may instruct escrow service provider 140 to decommission a particular private key following the completion of an SSL DDoS attack, after which it may no longer be necessary for escrow service provider 140 to establish SSL sessions or connections with clients on organization 120's behalf.

Figure 11:
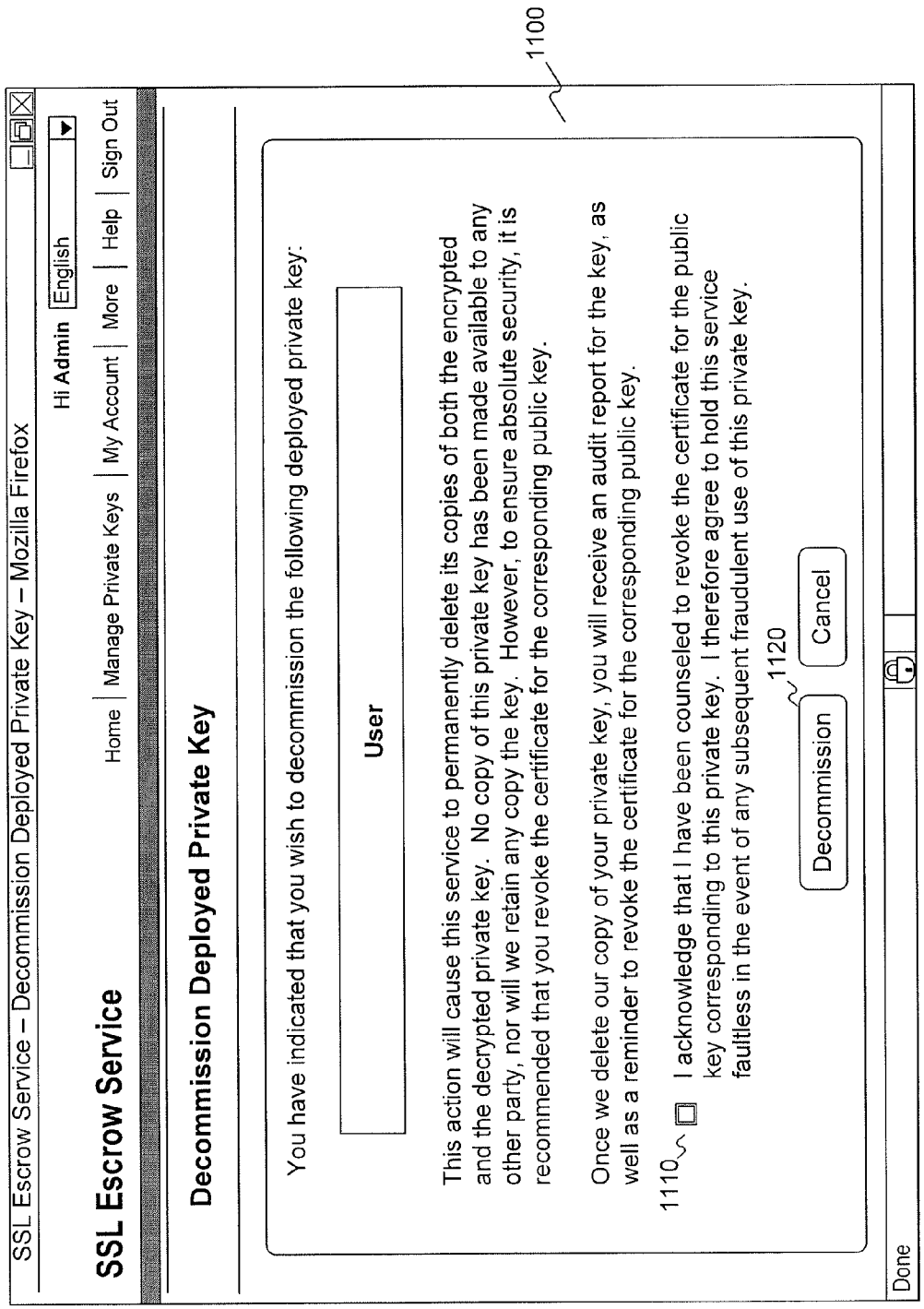
FIG. 11 is a diagram illustrating an exemplary decommission confirmation page of a secure SSL certificate escrow web platform, consistent with certain disclosed embodiments.

FIG. 11 is a diagram illustrating an exemplary decommission confirmation page of a secure SSL certificate escrow web platform, consistent with certain disclosed embodiments. As depicted in FIG. 11, decommission confirmation page 1100 provides information about the private key selected for decommissioning and provides the user with the option of confirming or canceling the user's request. Decommission confirmation page 1100 may also include a checkbox 1110 requiring the user to acknowledge that the user has been counseled to revoke the public key certificate for the selected private key once it has been deleted and to agree to hold escrow service provider 140 faultless for any future security breaches that may result from organization 120's failure to revoke the public key certificate.

In step 1030, escrow web platform 200 receives confirmation from the user to decommission the selected private key, for example as a result of clicking the decommission button 1120 of decommission confirmation page 1100. In step 1040, escrow web platform 200 may permanently delete all encrypted and unencrypted copies of organization 120's private key, public key certificate, and PKCS #12 certificate. In step 1050, escrow web platform 200 may update the audit trail for the decrypted private key to note, for example, the date and time that decommissioning was requested for the key, the user who authorized the decommissioning of the key, and the date and time that escrow web platform 200 confirmed permanent deletion of all encrypted and unencrypted copies of organization 120's private key, public key certificate, and PKCS #12 certificate.

Figure 12:
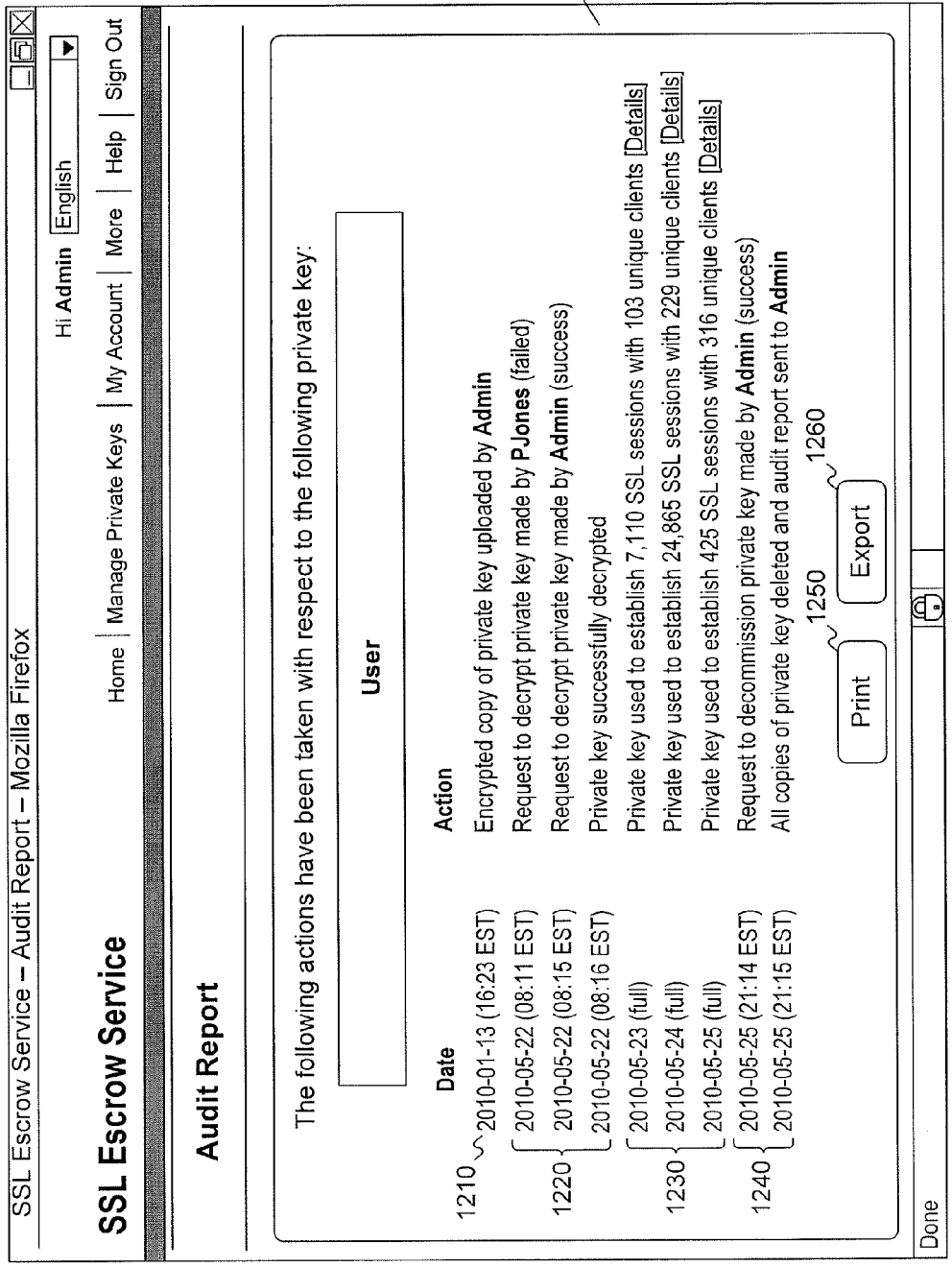
FIG. 12 is a diagram illustrating an exemplary audit report page of a secure SSL certificate escrow web platform, consistent with certain disclosed embodiments.

Escrow web platform 200 may present the audit trail for the decommissioned key to the user by redirecting the user's browser to a webpage containing the audit trail, for example as depicted in FIG. 12 (step 1060). Escrow web platform 200 may also send a copy of the audit trail to the user or to organization 120, for example by e-mail, along with a reminder to revoke the public key certificate. Organization 120 may be advised to revoke the public certificate for the decommissioned key to guarantee security as to that key following the decommissioning. In particular, if organization 120 revokes the public key certificate corresponding to the decommissioned private key, then attempts by any parties, including organization 120, to securely communicate with other entities using that private key will not be successful, since the public key certificate attesting to the authenticity of the corresponding public key will not be validated by the relevant Certificate Authority issuer. Therefore, even though organization 120 may have escrow service provider 140's guarantee that it has deleted all copies of organization 120's private key and has not allowed any other entity to access the unencrypted key, organization 120 may further guarantee that the decommissioned private key can no longer be used by any entity by revoking the corresponding public key certificate.

At the same time, if organization 120 also regularly uses the private key selected for decommissioning, organization 120 may not want to revoke the public key certificate for the that key, since that operation would also prevent organization 120 from using the private key for its own communications, which may create a potential disruption for organization 120's ability to securely communicate with clients over the Internet. Therefore, in some embodiments, organization 120 may maintain multiple private keys, including a primary private key that it uses for its own secure communications and a secondary private key that it may provide to one or more third-party escrow service providers for use in the event of a contingency, such as an SSL DDoS attack.

Organization 120 may maintain full secrecy for its primary private key by abstaining from sharing a copy of the primary private key with any third party. Organization 120 may provide escrow service provider 140 with an encrypted copy of its secondary key, for example according to the operations described with respect to FIGS. 4 and 5. In the event of an SSL DDoS attack or other event requiring escrow service provider 140 to access the unencrypted secondary key, organization 120 may supply the relevant passcode for decrypting the secondary key to escrow service provider 140, for example according to the operations described with respect to FIGS. 8 and 9. Escrow service provider 140 may then decrypt the secondary private key and use it to mitigate against an SSL DDoS attack on behalf of organization 120. Even though the decrypted secondary private key may be different from primary private key that organization 120 uses for its own secure communications, as long as the public key certificate corresponding to the secondary private key validates the secondary public key as belonging to organization 120, clients securely communicating with escrow service provider 140 should accept the secondary public key as valid.

Once the SSL DDoS attack has ceased or sufficiently subsided, organization 120 may decommission the secondary private key and revoke its corresponding public key certificate. Thereafter, although organization 120's secondary private key will no longer be valid for securely communicating with clients, organization 120 can resume securely communicating with clients using its primary private key, which was neither compromised nor revoked. In this manner, organization 120 can prevent disruptions to its secure communications that may be caused by revoking the public certificate corresponding to a primary private key used by organization 120.

FIG. 12 is a diagram illustrating an exemplary audit report page of a secure SSL certificate escrow web platform, consistent with certain disclosed embodiments. As depicted in FIG. 12, audit report page 1200 provides information about various actions that escrow service provider 140 may have taken with respect to a particular private key held by organization 120. Audit report information may include, for example, the time and manner in which the private key was uploaded to the escrow web platform 200, including the user responsible for uploading the private key (e.g., entries 1210); decryption or deployment requests or operations that were performed with respect to the private key (e.g., entries 1220); actions taken by escrow service provider 140 that made use of the unencrypted private key (e.g., entries 1230); and decommission or deletion operations that were performed with respect to the private key (e.g., entries 1240). Those skilled in the art, will appreciate that many other kinds of information and metrics concerning the private key could provided in audit report page 1200.

Audit report page 1200 may also include functionality for allowing users to print or export audit information related to the private key, such as the information provided in audit report page 1200 (e.g., buttons 1250 and 1260). The information provided by audit report page 1200 and/or buttons 1250 or 1260 may be used by organization 120 to comply with applicable policies or regulations governing organization 120's need to keep accurate records regarding all use and treatment of its private keys, especially in light of organization 120's sharing of one or more private keys with a third party such as escrow service provider 140.

The foregoing description of the invention, along with its associated embodiments, has been presented for purposes of illustration only. It is not exhaustive and does not limit the invention to the precise form disclosed. Those skilled in the art will appreciate from the foregoing description that modifications and variations are possible in light of the above teachings or may be acquired from practicing the invention. For example, although described in the context of a web platform, those skilled in the art will appreciate that the invention may also be implemented in any other form of software and/or hardware, such as a desktop application that executes on the key holder's computers, the escrow service's computers, or a combination of both. The steps described also need not be performed in the same sequence discussed or with the same degree of separation. And various steps may be omitted, repeated, or combined, as necessary, to achieve the same or similar objectives. Accordingly, the invention is not limited to the above-described embodiments, but instead is defined by the appended claims in light of their full scope of equivalents.

What is claimed is:

1. A computer-implemented method of securely providing a private key escrow service, comprising:
   providing, at a server of a private key escrow service provider, a user interface to enable a private key holder to manage a plurality of private keys, the user interface including a secure upload webpage to enable a private key holder to upload an encrypted copy of a private key for storage;
   receiving, at the server of the private key escrow service provider, the encrypted copy of the private key from the private key holder via the secure upload webpage;
   storing the encrypted copy of the private key in memory associated with the private key escrow service provider;
   providing, by the private key escrow service provider, a secure decryption webpage for the private key holder to enable the private key escrow service to decrypt the encrypted copy of the private key;
   receiving, via the user interface at the server of the private key escrow service provider, an instruction to decrypt the encrypted copy of the private key from the private key holder through the secure decryption webpage, wherein the instruction to decrypt includes an instruction to use the decrypted private key by the server of the private key escrow service provider; and
   decrypting, by the private key escrow service provider, the encrypted copy of the private key in response to the instruction to decrypt the encrypted copy of the private key, wherein decrypting the encrypted copy of the private key further comprises:
   accessing an unencrypted form of the private key; and
   using the unencrypted private key to securely communicate with one or more clients, wherein using the unencrypted private key to securely communicate with one or more clients comprises using the unencrypted private key to mitigate against a Secure Sockets Layer ("SSL") Denial-of-Service ("DoS") or Distributed Denial-of-Service ("DDoS") attack, wherein the SSL DoS or DDoS attack comprises an attack against one or more servers of the private key holder.

2. The method of claim 1, wherein the encrypted copy of the private key is protected by a passcode.

3. The method of claim 2, wherein the encrypted copy of the private key is protected by the passcode such that the private key escrow service is unable to access an unencrypted copy of the private key without the passcode.

4. The method of claim 3, wherein the instruction to decrypt includes the passcode, and wherein decrypting the encrypted copy of the private key comprises decrypting the encrypted copy of the private key using the passcode.

5. The method of claim 1, wherein storing the encrypted copy of the private key in memory further comprises:
   storing the encrypted copy of the private key in secure memory.

6. The method of claim 5, wherein storing the encrypted copy of the private key in secure memory further comprises:
   storing the encrypted copy of the private key in memory such that the encrypted copy of the private key may not be accessed by any human user.

7. The method of claim 1, further comprising:
providing a secure decommission webpage for allowing the private key holder to decommission the private key.

8. The method of claim 7, wherein decommissioning the private key comprises:
instructing the private key escrow service to cease using the unencrypted private key to communicate with clients.

9. The method of claim 8, wherein decommissioning the private key further comprises:
instructing the private key escrow service to permanently delete the unencrypted private key.

10. The method of claim 9, wherein decommissioning the private key further comprises:
sending a reminder to the private key holder to revoke a public key certificate associated with the private key.

11. The method of claim 9, wherein decommissioning the private key further comprises:
providing an audit report to the private key holder concerning actions taken by the private key escrow service with respect to the private key.

12. The method of claim 1, further comprising:
providing a secure deletion page for allowing the private key holder to delete one or more encrypted or unencrypted private keys entrusted to the private key escrow service.

13. The method of claim 1, further comprising:
providing an audit report to the private key holder concerning actions taken by the private key escrow service with respect to the private key.

14. The method of claim 1, further comprising:
providing a secure account management page for allowing the private key holder to manage one or more private keys entrusted to the private key escrow service.

15. A system for securely providing a private key escrow service, comprising:
a processing system comprising one or more processors;
one or more communications ports for receiving communications from one or more networked devices and transmitting communications to one or more networked devices; and
a memory system comprising one or more computer-readable media, wherein the computer-readable media store instructions that, when executed by the processing system, cause the processing system to perform the operations of:
providing, at a server of a private key escrow service provider, a user interface to enable a private key holder to manage a plurality of private keys, the user interface including a secure upload webpage for a private key holder to upload an encrypted copy of a private key for storage;
receiving, by the private key escrow service provider, the encrypted copy of the private key from the private key holder via the user interface at the secure upload webpage for storage;
storing the encrypted copy of the private key in memory associated with the private key escrow service provider;
providing, by the private key escrow service provider, a secure decryption webpage for the private key holder to enable the private key escrow service to decrypt the encrypted copy of the private key;
receiving, by the private key escrow service provider via the user interface, an instruction to decrypt the encrypted copy of the private key from the private key holder through the secure decryption webpage, wherein the instruction to decrypt includes an instruction to use the decrypted private key by the server of the private key escrow service provider; and
decrypting, by the private key escrow service provider, the encrypted copy of the private key in response to the instruction to decrypt the encrypted copy of the private key, wherein decrypting the encrypted copy of the private key further comprises:
accessing an unencrypted form of the private key; and
using the unencrypted private key to securely communicate with one or more clients, wherein using the unencrypted private key to securely communicate with one or more clients comprises using the unencrypted private key to mitigate against a Secure Sockets Layer ("SSL") Denial-of-Service ("DoS") or Distributed Denial-of-Service ("DDoS") attack, wherein the SSL DoS or DDoS attack comprises an attack against one or more servers of the private key holder.

16. The system of claim 15, wherein the encrypted copy of the private key is protected by a passcode.

17. The system of claim 16, wherein the encrypted copy of the private key is protected by the passcode such that the private key escrow service is unable to access an unencrypted copy of the private key without the passcode.

18. The system of claim 17, wherein the instruction to decrypt includes the passcode, and wherein decrypting the encrypted copy of the private key comprises decrypting the encrypted copy of the private key using the passcode.

19. The system of claim 15, wherein storing the encrypted copy of the private key in memory further comprises:
storing the encrypted copy of the private key in secure memory.

20. The system of claim 19, wherein storing the encrypted copy of the private key in secure memory further comprises:
storing the encrypted copy of the private key in memory such that the encrypted copy of the private key may not be accessed by any human user.

21. The system of claim 15, the operations further comprising:
providing a secure decommission webpage for allowing the private key holder to decommission the private key.

22. The system of claim 21, wherein decommissioning the private key comprises:
instructing the private key escrow service to cease using the unencrypted private key to communicate with clients.

23. The system of claim 22, wherein decommissioning the private key further comprises:
instructing the private key escrow service to permanently delete the unencrypted private key.

24. The system of claim 23, wherein decommissioning the private key further comprises:
sending a reminder to the private key holder to revoke a public key certificate associated with the private key.

25. The system of claim 23, wherein decommissioning the private key further comprises:
providing an audit report to the private key holder concerning actions taken by the private key escrow service with respect to the private key.

26. The system of claim 15, the operations further comprising:
providing a secure deletion page for allowing the private key holder to delete one or more encrypted or unencrypted private keys entrusted to the private key escrow service.

27. The system of claim 15, the operations further comprising:

providing an audit report to the private key holder concerning actions taken by the private key escrow service with respect to the private key.

28. The system of claim 15, the operations further comprising:
providing a secure account management page for allowing the private key holder to manage one or more private keys entrusted to the private key escrow service.

29. A computer-implemented method of securely providing a private key escrow service, comprising:
providing a user interface at a server of a private key escrow service, the user interface to enable a private key holder to manage a plurality of private keys, the user interface including a secure upload webpage having a plurality of fields to receive information from a user device to enable the private key holder to upload an encrypted copy of a private key, wherein the encrypted copy of the private key is protected by a first passcode such that the private key escrow service is unable to access an unencrypted copy of the private key without the first passcode, and wherein the secure upload webpage requires the private key holder to specify a second passcode for additionally securing the encrypted copy of the private key;
receiving, at a server of a private key escrow service provider, the encrypted copy of the private key and the second passcode from the private key holder via the secure upload webpage for storage;
storing, in memory associated with the private key escrow service provider, the encrypted copy of the private key in association with the second passcode;
providing, by the private key escrow service provider, a secure decryption webpage for the private key holder to enable the private key escrow service to decrypt the private key;
receiving, via the user interface at the server of the private key escrow service provider, an instruction to decrypt and use the private key from the private key holder through the secure decryption webpage, wherein the instruction to decrypt and use the private key includes the first passcode and the second passcode; and
decrypting and using, by the private key escrow service provider, the private key using the first passcode in response to the instruction to decrypt and use the private key and a determination that the private key holder has correctly provided the second passcode via the secure decryption webpage, wherein decrypting and using the private key further comprises:
accessing an unencrypted form of the private key; and
using the unencrypted private key to securely communicate with one or more clients, wherein using the unencrypted private key to securely communicate with one or more clients comprises using the unencrypted private key to mitigate against a Secure Sockets Layer ("SSL") Denial-of-Service ("DoS") or Distributed Denial-of-Service ("DDoS") attack, wherein the SSL DoS or DDoS attack comprises an attack against one or more servers of the private key holder.

* * * * *